Figures 3, 4:
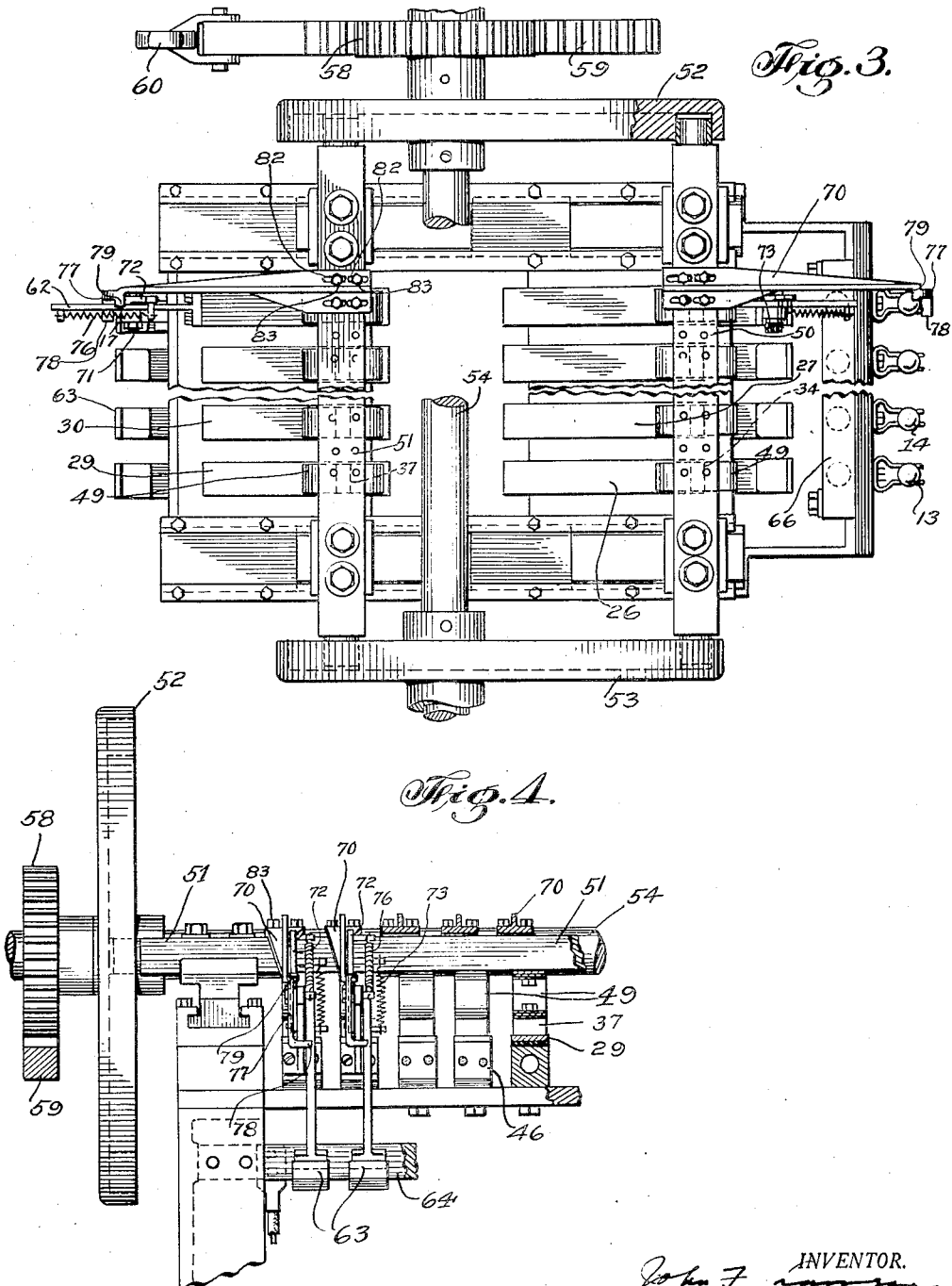

Nov. 21, 1933.   J. F. LAWSON   1,936,061
DIRECT CURRENT WELDING
Filed Nov. 9, 1928   2 Sheets-Sheet 1
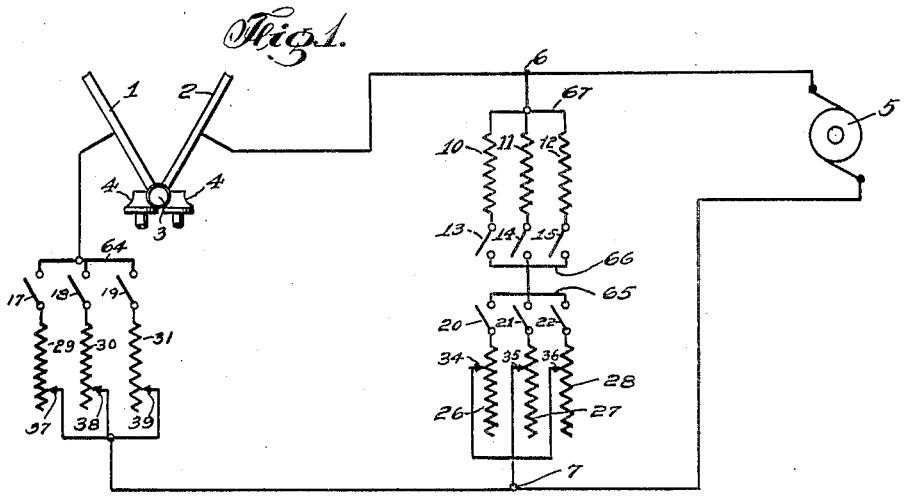
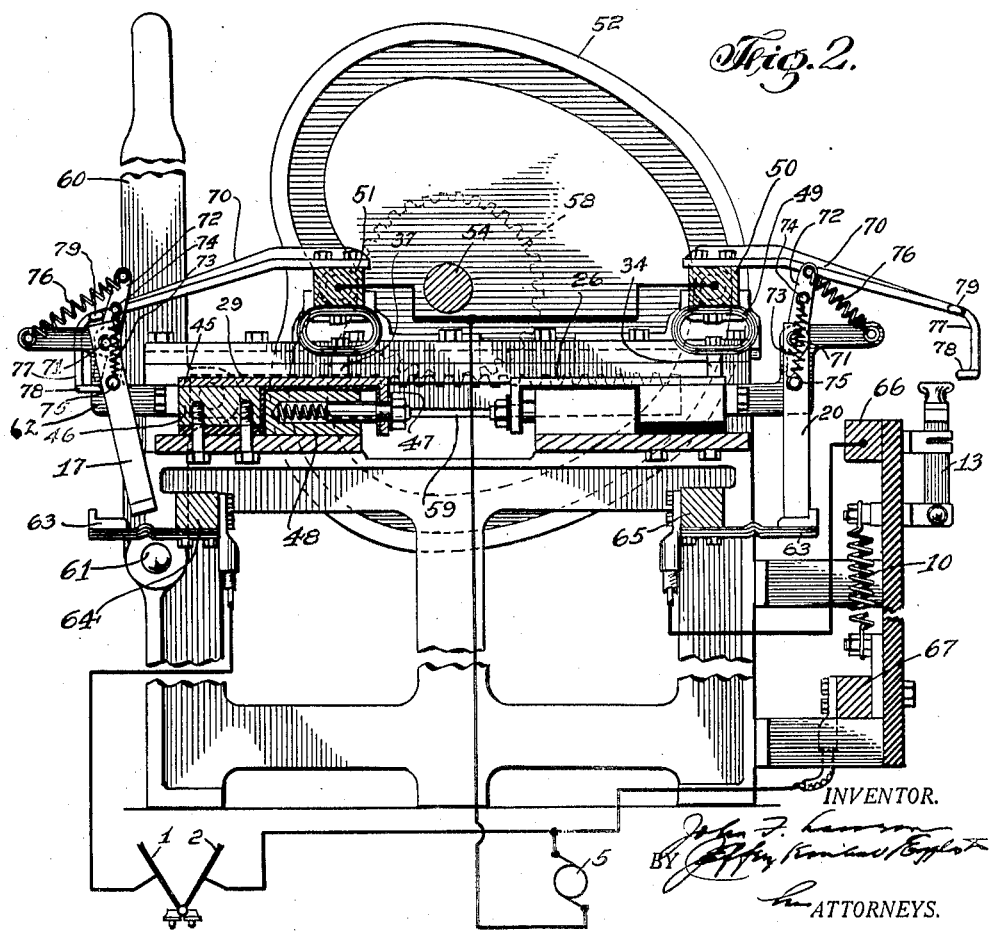

Nov. 21, 1933.   J. F. LAWSON   1,936,061
DIRECT CURRENT WELDING
Filed Nov. 9, 1928   2 Sheets-Sheet 2

INVENTOR.
John F. Lawson
BY
ATTORNEYS.

Patented Nov. 21, 1933

1,936,061

UNITED STATES PATENT OFFICE 1,936,061

DIRECT CURRENT WELDING

John Fisher Lawson, Brooklyn, N. Y.

Application November 9, 1928. Serial No. 318,160

20 Claims. (Cl. 219—4)

My invention relates to electric resistance welding of such long seams as are welded progressively from one end to the other. By electric resistance welding, it will be understood that I refer to that type or kind of welding method wherein the heat required is produced by an electric current in the work and the resistance which the work offers to the flow. My invention is intended especially for the manufacture of pipe, tubing and the like by such electric resistance welding, but it may be used for other purposes.

From long prior to my invention, it has been customary to do electric resistance welding of long seams by means of alternating current of commercial frequencies brought to the welding machine from a more or less remote source which has a capacity many times in excess of the demands of the welding machine and which supplies simultaneously many loads in addition to the welding machine. In such cases the energy can be and is brought close to the welding machine at a relatively high voltage and low current, and the switches by means of which the current flow is stopped and started at the welding machine are installed at some point of relative high voltage and low current. For various reasons, long seam electric resistance welding by other forms of current (direct current, high frequency current, etc.) has not been generally regarded as practically feasible. For example, direct current welding, involving as it does currents of some thousands of amperes at very low voltage, requires that the welding current be produced by a generator or generators that can serve, usually, no other load than the welders, and usually, if not always, the generators will be located at the welding plants. Hence usually the capacity of each generating equipment, that is to say, the capacities of both the generators themselves and their driving agencies, will not greatly exceed the full or maximum load of the welder or welders they serve, and the load of each welder will equal the whole or a rather large fraction of the capacity of the generating equipment that supplies it with welding current. However, it is well known that it is not feasible to suddenly impose on a generating system a load equal to the whole or a large fraction of its capacity; nor is it feasible to suddenly disconnect such a relatively large load from the source of current. Furthermore, to open and close a circuit carrying thousands of amperes, involves serious switching difficulties. Hence direct current welding of long seams has not been regarded as feasible heretofore, since the electric welding of such seams requires that the currents through the welders be stopped temporarily a number of times a day, and restarted quickly after each interruption.

My invention overcomes such difficulties as these, and hence permits the electric resistance welding of long seams in localities not served with electricity from a central generating plant, and permits the resistance welding of long seams by means of electric current in forms not otherwise available for the purpose, for example direct current, etc. Also it does this in a manner which satisfies the requirements of long-seam electric welders and their mode of operation.

As before indicated, I contemplate that the source of the electrical energy in the form employed for doing the welding, (e. g. direct current), will usually, if not always be a local source; that is to say, that the generator of this form of current will be located at the welding plant. According to my invention, I maintain the load on such a source of current substantially the same during the numerous temporary interruptions of the welding, as during the actual welding; or rather, to state the matter more accurately, I maintain the load on the source within such limits as the capacity and regulation of the generating equipment may require. For this purpose I provide an alternative circuit, or circuits, having a resistance about equal and equivalent to the welding machine or machines it or they serve. With this circuit or circuits, I load the generating equipment each time welding is temporarily suspended. This prevents undue fluctuations in load at the source of current. Where a number of welders are supplied by the same source of welding current, there may be such a circuit for each welder.

To avoid operating the cut-out switches of the alternative circuit and the welding circuit when these switches are carrying large currents, I may reduce the current at each cut-out switch to a practical value before opening it, as by increasing the resistance of the respective circuit served by the switch preliminary to opening the switch; or I may use a number of switches, each operating on only a fraction of the total current to be broken at the time; preferably I use both these expedients. Thus as to the alternative circuit, I propose to so construct this circuit that its resistance can be varied from a basic or minimum value substantially equal to the resistance of the related welding machine while welding, to a value so much greater as to reduce the current in the alternative circuit to a satisfactorily low value for switching; and instead of employing but a single variable resistance member operating as a unit and a single cut-out switch for the alternative circuit, I preferably construct the alternative circuit of a sectionalized resistance member or a number of variable resistance members and provide each section or resistance member with its own cut-out switch. These resistance members of the alternative circuit may be arranged in parallel with each other. In order to accommodate such a variable-resistance alternative circuit, I propose to put a resistance, correspondingly variable, in series with the welding machine during the change-over operations, and this resistance also can be and preferably is made up of a sectionalized resistance member or a number of variable resistance members, each served by its own switch. Assuming that the alternative circuit, adjusted to its maximum value of resistance, is connected to the source of current and that the resistance of this circuit is then gradually reduced, while at the same time the effective value of the resistance in series with the welding machine is gradually increased, it is apparent that the load on the source of current can be transferred from the welding circuit to the alternative circuit and at the end the welding circuit completely opened, without requiring that any switch be operated while the circuit it controls is carrying any great value of current. The reverse of these operations restores the full welding current to the welding machine, puts the series resistance of the welding circuit out of action, and likewise permits the switch or switches of the alternative circuit to be opened under little current.

These operations of transferring the load on the current source from the welding circuit to the alternative circuit and vice versa, can be performed with such rapidity as satisfies the requirements of long seam welding. To the end that the various steps may be performed in the proper order and in the proper time relation, as well as quickly when the need arises, I preferably put all the resistance-varying mechanism and the various switches under the control of a single operating member. One example of such an arrangement is described hereinafter.

Finally, I may fix the basic or minimum resistance of the alternative circuit by means of a sectionalized resistance member or a number of resistance members independent of, and in effect separate from, the resistance member or members by means of which the resistance of the alternative circuit is varied as the load on the source of current is transferred from the welding machine to the alternative circuit and vice versa. By using an individual switch for each of these sections or resistance members, the basic resistance of the alternative circuit can be adjusted at the beginning of a welding operation to suit the particular work to be handled by the welding machine, without affecting or requiring any modification in the resistance members which take part in the shifting of the load, or in the devices or the operation of the devices which cooperate with these resistances.

While my invention is described as it relates to welding plants where the welding current is generated locally and the load of each welder represents the whole or a rather large fraction of the capacity of the generating equipment, it will be observed that it is applicable also to plants where the welding current is supplied from a larger or central station and the fluctuation in load caused by starting or stopping a welder is not so important. It will then serve at least to simplify the switching operations or permit switching operations that may be desirable.

My invention will be more completely understood from the embodiment of it shown in the accompanying drawings, wherein direct current is employed. Fig. 1, mostly in the form of a circuit diagram, illustrates diagrammatically the invention applied to a single tube welding machine. Fig. 2 is a sectional elevation of a mechanism containing the variable resistances and switches of the foregoing diagram, and by means of which both the effective values of these resistances can be varied and the switches operated at the proper times by a single act by the operator of the welding machine; the welding machine, generator and electrical connections are shown diagrammatically in this figure. Fig. 3 is a plan view of the mechanism of Fig. 2, broken at the middle and partly in section. Fig. 4 is an elevation at right angles to Fig. 2 showing one end of the mechanism of that figure.

Referring first to Fig. 1: As representative of an electric resistance welding machine for welding long seams progressively from one end to the other, and particularly a tube welder of this type, roller electrodes 1 and 2 are shown diagrammatically bearing on a tube 3 constituting the work, the latter being supported by the customary pressure rollers 4. As customary with welders of this type, and as will be understood by the reference to electric resistance welding, welding current is supplied to and passed between the electrodes 1 and 2 and hence through the work 3, and the resistance of the work to the flow of current causes the development of the welding heat; at the same time welding pressure is exerted on the work and seam by the electrodes 1 and 2 or by the cooperation of the electrodes and the pressure roller or rollers 4 to complete the weld; for the most part the current at any instant flows through, and the pressure is exerted on only a short section of the tube 3; however the tube is passed endwise through this relatively narrow zone of current and pressure adjacent the electrodes, and thereby the long longitudinal seam of the tube is welded progressively from one end to the other. At 5 is a direct current generator for producing the direct-current welding current; this generator can be assumed to be located in the welding plant and driven by an electric motor or prime mover. The alternative circuit to which the load on the generator is transferred when the welding is interrupted temporarily at the welding machine 1—2, is connected between the points 6 and 7 on the conductors connecting the generator to the welding machine; this alternative circuit is in parallel with the welding machine. The basic or minimum resistance of the alternative circuit is provided by the resistance members 10, 11 and 12; as many may be used as needed; the three shown will serve for the purposes of the description however. By the respective switches 13, 14 and 15, one for each of these resistance members, and each manually operable independently of all the others, any one or more of the resistance members 10, 11, 12, etc., can be connected in circuit, so many being used at any time as may be necessary to provide the alternative circuit with a basic or minimum value of resistance substantially equal and equivalent to the resistance at the welding machine 1—2, when the latter is in operation. As I have pointed out before, this basic or minimum resistance may vary with the work, for example when a change is made from welding large pipe to welding small pipe; and a sectionalized resistance member or a number of resistance members as represented by 10, 11 and 12, with their individual switches 13, 14 and 15, permit the basic or minimum resistance of the alternative circuit to be adjusted from time to time, without modification of any other part of the alternative circuit. Conveniently some of these resistance members or sections 10, 11, 12, etc. are given smaller values of resistance than the others, in order to provide for both coarse and fine adjustments, and this is assumed to be shown in the drawings.

The function of the switches 17, 18 and 19 is to open the circuit through the welding machine when the load on the current source has been transferred to the alternative circuit, and to close the welding circuit again when welding is to be resumed. The function of the switches 20, 21 and 22 is to close and open the alternative circuit. Connected to the switch 20, is one end of the resistance member 26, the resistance value of which is such that the current which the voltage of the source 5 is capable of forcing through it, when the whole of it is in circuit, is of such a low value that the switch 20 can be operated in a practical manner. A similar resistance member 27, 28 is provided for each of the switches 21 and 22, and likewise a similar resistance member 29, 30, 31 is provided for each of the switches 17, 18 and 19. Sliders 34, 35, 36, 37, 38 and 39 for the respective resistance members, each movable substantially from one end to the other of its resistance member, serves to vary the effective resistance of each of these members. All the electrical connections will be understood from the figure. The function of these resistance members is to reduce the currents at their respective switches to a sufficiently low value for satisfactory switch operation preliminary to the opening of these switches, and to provide the circuit of each of these switches with a rather high value of resistance preliminary to closing the switch so as to limit the current through each switch to a relatively low value at the instant of closing. As many switches 20, 21, 22 and 17, 18, 19, and accordingly as many of the cooperating variable resistances, one for each switch, will be provided in each group as the designer may deem necessary or desirable for the particular conditions in hand, and I contemplate that more than three per group will be used ordinarily; for example for a welding machine taking up to ten thousand amperes, I contemplate using ten switches in each group and correspondingly ten variable resistances in each group, and I contemplate giving each of these resistance members such a value of resistance in ohms that it will pass only about one hundred amperes under the welding voltage. However, three switches and resistance members per group as shown in Fig. 1 will serve for this illustration. Conveniently, as suggested in the foregoing example, there may be as many of the variable resistance members in the group 26, 27, 28 etc. as there are in the group 29, 30, 31 etc., and in that case of course the number of switches 20, 21, 22, etc. will equal the number of switches 17, 18, 19, etc. Also it will usually be most convenient, I believe, to give the members, 26, 27, 28, etc., equal values of resistance, and to give the members 29, 30, 31, etc., values of resistance respectively corresponding.

The various devices are operated as follows: Preliminary to or as a part of starting a new welding operation, so many of the switches 13, 14, 15, etc., are closed as may be needed to fix the basic or minimum resistance of the alternative circuit at a value substantially or sufficiently equal to the resistance at the welding machine 1—2 while welding the particular work to be handled at the time. While the welding is actually being done, the switches 17, 18, 19 are closed and the sliders 37, 38, 39 are located at or beyond the upper ends of the resistance members 29, 30, 31, respectively so that these resistance members are inactive and the welding current does not travel them. No energy is lost in these resistance members therefore while the welding is going on. At this time the sliders 34, 35, 36, are at rest on the lower ends of the resistance members 26, 27, 28; that is to say, remote from those ends of these resistance members that are connected to the switches 20, 21, 22. At the same time, these switches are open. No current flows through the alternative circuit therefore and no energy is lost in this circuit while the welding is actually in process. When now it becomes necessary to interrupt the welding temporarily at the machine 1—2, the first act is to close the switches 20, 21, 22. This permits current to flow in the alternative circuit, but the current is of a relatively low value because of the fact that the whole of each of the resistance members 26, 27, 28, is active. This will tend to increase the load on the source 5 by a corresponding amount, and if this increase, by suitable design of the apparatus, is within the limits permitted by the capacity and regulation of the generating system 5, the increase may be permitted; but usually I arrange to close the switches 20, 21, 22 etc. seriatim, and while these switches are in the act of being closed, I move the sliders 37, 38, 39, etc. downwardly, i. e. away from the switches 17, 18, 19 etc., such distances that by the time the last of the switches 20, 21, 22 etc. has been closed, the resistance members 29, 30, 31 etc. have increased the resistance of the welding circuit so much that the current in the welding circuit has been reduced by an amount substantially equal to the amount of current produced in the alternative circuit by the closing of the switches 20, 21, 22, etc. This avoids any material change in the load on the generator at 5, at the closing of the group of switches 20, 21, 22. The sliders of the group 37, 38, 39 are now continued in motion (downwardly in the figure) to include more and more of each of the resistance members of the group 29, 30, 31 in series with the welder 1—2, and at the same time the sliders of the group 34, 35, 36, are moved upwardly in the figure, to decrease the effective resistance of the group 26, 27, 28, the two movements going on simultaneously and the movement of each group of sliders being always at such a rate that the increase in resistance in the welding circuit is accompanied by a corresponding decrease in resistance in the alternative circuit. Accordingly the reduction in the current flowing in the welding circuit is accompanied by a corresponding increase in the current in the alternative circuit, and this continues until the sliders approach or reach the ends of their resistance members toward which they are moving. As the sliders of the group 37, 38, 39 approach or reach the lower ends of their resistance members, and the sliders of the group 34, 35, 36, approach the upper ends of their respective resistance members, the switches of the group 17, 18, 19 are opened to entirely disconnect the welding machine from the source 5. This can now be done in a satisfactory manner so far as switch operation is concerned, because the current now carried by each of these switches is at a satisfactorily low value. However, as with the closing of the switches of group 20, 21, 22, etc. these switches of group 17, 18, 19 may be opened seriatim, one of these switches being opened after another, and the opening operations taking place during the final part of the movement of the sliders 34, 35, 36, etc. to their uppermost positions, and taking place at such a rate that the current excluded from the welding circuit by the opening of each switch is substantially taken over by the alternative circuit by the upward movement of the sliders. In their final positions, the sliders of the group 34, 35, 36, are at the extreme upper ends of their resistance members, and thereby the latter are rendered entirely inactive (this of course is on the assumption that 10, 11, 12, etc. offer a resistance to the flow of current substantially equal and equivalent to the resistance of the welding machine when welding is being done). The load on the generating equipment has now been transferred from the welding machine to the alternative circuit. When welding is to be resumed again the load is transferred back to the welding machine by the reverse of the foregoing operation.

In order that these various steps of these operations may be taken quickly and in the proper order, and in the proper relation to each other, it is preferable that the whole operation of transferring the load between the two circuits be put under the control of a single means which the operator of the welding machine can operate by a single act, as before pointed out. A mechanism for this purpose is illustrated in Figs. 2, 3 and 4. Referring now to those figures:

On a suitable frame work the resistance members of group 29, 30, 31, are arranged in a row, and in a parallel row are placed the resistance members of group 26, 27, 28 (see Figs. 2 and 3). In view of the fact that the absolute resistance of each of these resistance members will be very low (a very small fraction of an ohm), and since each of these resistance members must be adapted to carry rather large values of current, these resistance members are conveniently made in the form of bars as shown in Figs. 2 and 3, say of a material having a relatively high specific resistance and, if necessary, of a material suffering no damage if heated somewhat in air. Preferably each bar is bent slightly so that it is slightly convexed toward its slider (i. e. convexed upwardly in Fig. 2) and one end 45 of each is rigidly fastened to an individual block 46, while the other end is turned down at 47 to make a sliding connection with the supporting block 48. The sliding connection permits the bars to expand and contract as they may heat and cool in use, and the concave-convex form of the bars tends to keep them in intimate contact with their slides as they heat and cool. The sliding connection with block 48 may be slightly spring pressed to assist in straightening them out should they tend to rise too high as they heat up. It will be understood that the bars 46 are sufficiently insulated from each other to prevent short circuiting; in fact it will be understood that various metallic parts of the mechanism being described are insulated from others so far as necessary to prevent short circuits; certain of the insulation is indicated in the drawings.

The sliders 37, 38, 39, etc. and 34, 35, 36, etc. which cooperate with these resistance members 29, 30, 31, etc. and 26, 27, 28, etc. are mounted on individual resilient members 49 (one for each slider), the function of which is to afford some yielding and thus help maintain the respective sliders in good contact with the resistance members without engendering too much friction. These resilient members 49 are in turn connected to the bus bars 50 and 51, those of the sliders of the group 34, etc. being connected to the bus bar 50 and those of the group of sliders 37, etc. being connected to the bus bar 51. The electrical connection of the sliders to the source of current 5 is made by way of these bus bars and resilient members, the two bus bars together being connected to one side of the source of current as indicated in both Figs. 1 and 2. The two ends of the bus bars 50 and 51 extend into two cams 52 and 53 carried on and turned by a shaft 54. Preferably I so shape these cams that one-half of a rotation of the cams moves the sliders from one end of their respective resistance members to the other; essentially, however, they are so shaped that they move the two groups of sliders at such relative rates of speed as to cause the current in one of the two principal circuits to increase substantially at the same rate as the current in the other of these circuits is reduced, as will be understood from the foregoing description of the method of operation of my invention as explained with reference to Fig. 1. Cams shaped to accomplish both these results will have a heart-shape substantially as shown, assuming that the resistance per unit length is the same throughout each and all the resistance members. To turn the cams, the shaft 54 is provided with a toothed wheel 58 gearing into a rack bar 59 which is coupled to an operating lever or handle 60 pivoted to the frame of the mechanism at 61 (Fig. 2). Thus by a single throw of the handle or lever 60 shown, all the sliders are made to traverse their respective resistance members from one end to the other, and to traverse the resistance members at the proper relative rates of speed, no matter how fast or how slow the cams may be turned.

The movable blade of the switch 17 (Fig. 2) is hinged at 71 on a bracket 62 mounted on the block 46 to which the resistance member 29 is connected; the co-operating fixed contact 63 of this switch is carried by and electrically connected to the bus bar 64 which is mounted on the framework. The movable blades of the remainders of the group of switches 17, 18, 19, etc. are similarly mounted with respect to their respective resistance members, and the fixed contacts of the whole group are all connected to the bus bar 64. Corresponding to the circuit arrangement of Fig. 1, this bus bar 64 is connected to the roller electrode 1 of the welding machine as is indicated in Fig. 2. The switches of group 20, 21, 22, etc. are similarly mounted with respect to their respective resistance members 26, 27, 28, etc., and the fixed contact portions of these switches are all connected to the bus bar 65, which is electrically connected to the bus bar 66 to which is connected one side of each of the switches 13, 14, 15, etc. by means of which the basic or minimum resistance of the alternative circuit is fixed as before described. Conveniently, the bus bar 66, manual switches 13, 14, 15, etc., the resistance members 10, 11, 12, etc. and the bus bar 67 to which the latter resistance members are all connected, are assembled on a panel which is fastened to the frame work as shown. Corresponding to Fig. 1, the bus bar 67 is connected to one side of the source of current 5 and the remaining electrode 2 of the welding machine is connected to the same side of the source of current as is illustrated diagrammatically in Fig. 2.

It will be understood that while the basic resistance member 10 is shown in Fig. 2 in the form of a spiral wire, these resistance members may take other forms. The switches 17, 18, 19, etc. and 20, 21, 22, etc. are individually operated by individual arms 70 carried by the bus bars 50 and 51. Each pin 71 by means of which the switch blades are hinged to the brackets 62, is fixed to its switch blade (and turns in its bracket), and is also fixed to an individual lever 72. A spiral spring 73 is connected to each lever 72 at 74, and to the movable blade of the respective switch by means of the pin 75. It is obvious that as the top of each lever 72 is swung to the right or left, the respective spring 73 is carried over the center line of the pin 71 and thereby the respective switch blade is snapped closed or quickly snapped open as the case may be. A spring 76, one for each of the levers 72, is provided to pull the lever 72 in such a direction as to cause the switches to close. However, the members 70 are respectively hooked around one side of the respective levers 72 as indicated in Figs. 2, 3 and 4 so that as the bus bars 50 and 51 respectively approach their inner positions (the position shown for the bus bar 51 in Fig. 2) these members 70 move the levers 72 against the tensions of the springs 76, so as to open the respective switches; on the other hand as these bus bars leave their inner positions when starting toward their outer positions, the hooks 79 of the members 70 leave the lever 72 and these are then pulled over by their springs 76, so that the respective switches are then closed. By means of extensions 77, one from each of the members 70, and the offset points 78 of these extensions which are disposed to strike the switch blades when closed and the members 70 are moving to their innermost positions, the switches are positively opened should they fail to open under the pull of the springs 73. Accordingly, it will be seen that the two groups of switches 17, 18, 19, etc. and 20, 21, 22, etc., are opened as their respective sliders approach their inner positions, and are closed again as their sliders depart from these inner positions and commence their movement toward their outer positions, all in accordance with the method of operation described with respect to Fig. 1. To secure the successive or seriatim operation of the switches of the series 17, 18, 19, etc., and likewise successive or seriatim operation of the series 20, 21, 22, etc., the members 70 of each group are made respectively one a little shorter than another, or the members 70 can be slotted as at 82 for the bolts 83 which hold the members 70 to the bus bars 50 and 51, and thereby in locating the respective members 70 on the bus bars 50 and 51 those in each group can be arranged to project out one beyond another sufficiently to cause the desired seriatim operation of the switches of each of the two groups.

The operation of the mechanism of Figs. 2, 3 and 4 is rather evident. To transfer the load from the alternative circuit to the welding machine (the mechanism being in the position shown in Fig. 2) the operator grasps the lever 60 and with a quick short pull to the left, turns the shaft 54 and thereby the cams 52 and 53 a half rotation. As the bus bars 50 and 51 start to the left, the switches 17, 18, 19, etc., are snapped closed one after the other, and the arrangement is intended to be such that the last one closes at substantially the instant that the sliders 34, 35, 36, etc. have reached such positions that the current through the alternate circuit has been reduced by an amount substantially equal to the amount of current which the closing of the switches 17, 18, 19, etc. permits to flow through the welding circuit. As the cams continue to move the bus bars to the left, the shape of the cams causes the two bus bars to move at those generally unequal and varying speeds that are necessary to cause the current in the alternative circuit to be reduced at substantially the same rate as current is built up in the welding circuit. The relative rates will be understood by those skilled in the art; at the beginning of the movement, the bus bar 50 is moved more slowly than the bar 51, and near the end of the movement is moved more rapidly than bar 51. As the end of the movement is approached the switches 20, 21, 22, etc. are opened successively in the manner before described, this taking place during the time that the sliders 37, 38, 39, etc. are permitting a current increase in the welding circuit corresponding to the decrease in current in the alternative circuit caused by the opening of these switches. When the welding is to be interrupted again, a return movement of the handle or lever 60 restores the load to the alternative circuit by a reverse operation.

It will be understood that my invention is not limited to the details herein illustrated and described except as appears in the following claims:

1. The combination of an electric resistance welding machine, a source to supply current for welding, a circuit alternative to the circuit through the welding machine to take current from said source and having a basic resistance about equal to the resistance at the welding machine when welding, means whereby the resistance of the alternative circuit can be increased considerably at will, switch means for opening and closing said alternative circuit when its resistance is so increased, means whereby the resistance of the circuit through the welding machine can be increased considerably at will, and switch means for opening and closing the circuit through the welding machine when the resistance of that circuit is so increased.

2. The combination of an electric resistance welding machine adapted to weld a long seam progressively, a local source to supply current for the welding, a circuit alternative to the circuit through the welding machine to take current from said source, means to gradually increase the current taken by said alternative circuit from said source to a value about equal to the welding current and to gradually reduce the current in said alternative circuit again, and means to gradually increase the current through the welding machine from a lower value to the value desired for the welding and to gradually reduce the same again, said two means being operable to increase the current in one circuit when the current in the other is decreased and vice versa decrease the current in the one circuit when the current in the other is increased.

3. The combination of an electric resistance welding machine adapted to weld a long seam progressively, a source to supply current for the welding, a circuit alternative to the circuit through the welding machine to take current from said source, means to gradually increase the current taken by said alternative circuit from said source to a value about equal to the welding current and to gradually reduce the current in said alternative circuit again, a switch for said alternative circuit to open said circuit when the current therein is considerably less than the welding current, means to gradually increase the current through the welding machine to the desired welding value and to gradually reduce the same again, and a switch to open the circuit through the welding machine when the current therethrough is considerably less than the welding current.

4. The combination of an electric resistance welding machine, adapted to weld a long seam progressively, a source to supply current for the welding, a circuit alternative to the circuit through the welding machine to take current from said source, means to gradually increase the flow of current through said alternative circuit to a value about equal to the welding current and to gradually reduce the current therein again, a switch for said alternative circuit to open said circuit when the current therein is considerably less than the welding current, means to gradually increase the current through the welding machine to the desired welding value and to gradually reduce the same again, a switch to open the circuit through the welding machine when the current therethrough is considerably less than the welding current, and a single mechanism to operate both said means and the switches.

5. The combination of an electric resistance welding machine for welding a long seam progressively, a source to supply current for welding, a circuit alternative to the circuit through the welding machine to take current from said source, means for changing the resistance of said alternative circuit from a value about equal to the resistance at the welding machine when welding to a considerably greater value and vice versa, a resistance member in series with the welding machine, and means operating on said member for reducing the resistance of the circuit through the welding machine and vice versa increasing while current is flowing through the welding machine circuit, the resistance of the circuit through the welding machine to a value considerably greater than the resistance of the welding machine when welding.

6. The combination of an electric resistance welding machine, a source to supply current for welding, means to provide a circuit alternative to the circuit through the welder to take current from said source, said means including means to provide said alternative circuit with a basic value of resistance substantially equal to the resistance at the welding machine when said machine is in operation, said second mentioned means including a plurality of resistance members and a substantially independently operable switch means for each of said plurality of resistance members to cause current of said alternative circuit to flow through or be excluded from the respective resistance members, and means for connecting the alternative circuit and the welding machine to said source of current alternately.

7. The combination of an electric resistance welding machine, a source to supply current for welding, means to provide a circuit alternative to the circuit through the welder to take current from said source, said means including means to provide said alternative circuit with a basic value of resistance substantially equal to the resistance at the welding machine when said machine is in operation, said second mentioned means including a plurality of resistance members and a substantially independently operable switch means for each of said plurality of resistance members to cause current of said alternative circuit to flow through or be excluded from the respective resistance members, means for increasing the resistance of said alternative circuit considerably above said basic value and reducing it again, and means for correspondingly increasing the resistance in the circuit containing the welding machine above the value at the welding machine during welding and likewise reducing it.

8. The combination of an electric resistance welding machine adapted to weld a long seam progressively, a source to supply current for the welding, a circuit alternative to the circuit through the welding machine to take current from said source, a plurality of resistance members in said alternative circuit, connected in parallel, a plurality of resistance members connected in parallel with each other and together connected in series with the welding machine, and a switch in series with each of said resistance members to open and close the individual circuits through said resistance members.

9. The subject matter of claim 8, characterized by the fact that means are provided for removing the effect of the last mentioned parallel-connected resistance members from the circuit through the welding machine when welding is to be done.

10. The combination of an electric resistance welding machine adapted to weld a long seam progressively, a source to supply current for the welding, a circuit alternative to the circuit through the welding machine to take current from said source, a plurality of resistance members in said alternative circuit, connected in parallel, a plurality of resistance members connected in parallel with each other and together connected in series with the welding machine, a switch in series with each of said resistance members to open and close the individual circuits through said resistance members, the resistance members being adapted to be traversed by sliders to change the amount of each resistance member active in its respective circuit, sliders to traverse the resistance members for this purpose, and a single means to operate said sliders and said switches, said means so operating the respective sliders that the resistance of each circuit is decreased correspondingly to the increase in resistance in the other circuit and so operating the switches that the alternative circuit and likewise the circuit through the welding machine is opened when the resistance of the respective circuit has been increased considerably and is closed when the resistance of the other circuit is about to be decreased by its sliders.

11. The combination of an electric resistance welding machine for welding long seams progressively, a source of current supply therefor, a circuit alternative to the circuit through said welding machine to take current from said source, and means for gradually increasing and decreasing the resistance of the circuit through said welding machine while current is flowing in said circuit, and gradually increasing and decreasing the resistance of said alternative circuit while current is flowing through the alternative circuit.

12. The combination of an electric resistance welding machine for welding long seams progressively, a source of current supply therefor, a circuit alternative to the circuit through said welding machine to take current from said source, means for gradually increasing and decreasing the resistance of the circuit through said welding machine while current is flowing in said circuit, and gradually increasing and decreasing the resistance of said alternative circuit while current is flowing through the alternative circuit, and switch means for opening and closing the said alternative circuit and for opening and closing the circuit through said welding machine, said switch means being operable when the resistance of the respective circuit is high.

13. The method of operating an electric resistance welding installation adapted to weld long seams progressively, using current derived from a local source, which consists in relatively moving an article having a long seam to be welded and welding electrodes engaging the same in welding position, passing current from a local source to the welding electrodes, maintaining the current demands on the source of current substantially the same at all times within the limits dictated by the capacity and regulation of the source of current and varying the amount of current supplied to the electrodes preliminary to starting and stopping the welding operation.

14. The method of operating an electric resistance welding installation adapted to weld long seams progressively, using current derived from a local source, which consists in relatively moving the work having the long seams to be welded and welding electrode means engaging the work in welding relation thereto, passing welding current through said electrode means and thereby across said seams while the work and the welding electrode means are moving relatively to each other in welding relation, gradually reducing the current through said electrode means when welding is to be discontinued temporarily and simultaneously correspondingly increasing the current through another circuit supplied by the same local source of current, and vice versa gradually reducing the current through said other circuit and correspondingly increasing the current through said welding electrode means when welding is to be resumed again.

15. The combination of an electric resistance welding machine having electrode means adapted to contact with and pass the welding current through work having long seams as the work is passed through the machine, a local source of current therefor, a circuit alternative to the circuit through said welding machine arranged to take current from said source, and means for changing the resistance of said alternative circuit from a value approximating the resistance of the welding machine circuit when welding to a considerably greater value and vice versa, and for changing the resistance of the circuit through the welding machine from the value when welding to a considerably higher value and vice versa, the resistance of said alternative circuit and the resistance of the welding machine being changeable in opposite senses simultaneously.

16. In the progressive electric welding of long seams, using current derived from a local source, the method which consists in passing the welding current through a short section of the work and simultaneously exerting welding pressure thereon, passing the work through this zone of welding current and pressure, and gradually reducing the current through the work when the welding is to be discontinued temporarily and simultaneously with the latter correspondingly increasing the current through another circuit supplied by the same source of current, and vice versa gradually reducing the current through said other circuit and correspondingly increasing the current through the work when the welding is to be resumed again.

17. In the progressive electric welding of long seams, the method which consists in passing the welding current through a short section of the work and simultaneously exerting welding pressure thereon, passing the work through this zone of welding current and pressure, and when the welding is to be interrupted temporarily, completing another circuit through the source of welding current, gradually reducing the current through the work and simultaneously with the latter correspondingly increasing the current through said other circuit and opening the circuit through the work after the current through the work has been considerably reduced, and vice versa when the welding is to be resumed first closing the circuit through the work, then gradually reducing the current through said other circuit and simultaneously therewith increasing the current in the circuit through the work, and opening said other circuit after the current in the circuit through the work has reached substantially its welding value.

18. In the progressive electric welding of long seams, the method which consists in passing welding current through a short section of the work and simultaneously exerting welding pressure thereon, passing the work through this zone of welding current and pressure, and, when the welding is to be interrupted temporarily, increasing considerably the resistance of the circuit through the work and thereafter opening that circuit.

19. The subject matter of claim 18, characterized by the fact that to resume welding, the said circuit through the work is closed while the resistance of said circuit is considerably greater than its resistance while welding is being done, and thereafter the resistance of said circuit is reduced to its normal welding value.

20. The combination of an electric resistance welding machine adapted to weld a long seam progressively, a local source to supply current for the welding, a circuit alternative to the circuit through the welding machine to take current from said source, a plurality of resistance members in said alternative circuit, connected in parallel, a plurality of resistance members connected in parallel with each other and together connected in series with the welding machine, the resistance member being adapted to be traversed by sliders to change the amount of each resistance member active in its respective circuit, sliders to traverse the resistance members for this purpose, and a single means to operate said sliders, said means so operating the respective sliders that the resistance in each circuit is decreased correspondingly to the increase in resistance in the other circuit.

JOHN FISHER LAWSON.